United States Patent [19]

Larson

[11] Patent Number: 4,685,438

[45] Date of Patent: Aug. 11, 1987

[54] ARCHERY BOW QUIVER

[76] Inventor: Marlow Larson, 2735 S. 4050 West, Ogden, Utah 84401

[21] Appl. No.: 818,191

[22] Filed: Jan. 10, 1986

[51] Int. Cl.⁴ ............................................. F41C 33/00
[52] U.S. Cl. ..................................... 124/24 A; 124/86
[58] Field of Search ............... 124/23 A, 24 A, 41 R, 124/45, 88, 23 R, 48, 41 A, 86

[56] References Cited

U.S. PATENT DOCUMENTS 3,465,928  9/1969  Osterholm .................. 124/23 A
4,020,984  5/1977  Morris ......................... 124/24 A

FOREIGN PATENT DOCUMENTS 752176  2/1967  Canada ......................... 124/24 A

OTHER PUBLICATIONS

Gander Mountain Catalog, 5/66, p. 40.

Primary Examiner—Richard C. Pinkham
Assistant Examiner—T. Brown
Attorney, Agent, or Firm—Trask, Britt & Rossa

[57] ABSTRACT

A quiver mounting system for archery bows includes a rotational coupling-decoupling mechanism and a two-point attachment mechanism to provide for rapid attachment or detachment of a quiver in the field, as well as a stable mounting. The rotational coupling mechanism is located at a first point and includes a socket having an opening of irregular configuration and a connector resiliently extending through the opening and engaging the exterior wall of the socket. The socket is connected to the bow and the connector to the quiver. When the connector is rotated relative to the socket, it passes through the opening and the quiver is decoupled from the bow. The quiver is also detachably connected at a second point to the bow. The connection at this second point must be detached to permit the relative rotation between the socket and connector.

9 Claims, 6 Drawing Figures

4,685,438

ARCHERY BOW QUIVER

BACKGROUND OF THE INVENTION

1. Field

This invention pertains to archery bows and is directed to a quiver for such bows. Specifically, it provides a mechanism for quickly attaching and detaching a quiver from an archery bow and for providing a rigid attachment of the quiver to the bow during use.

2. State of the Art

Many forms of arrow holding devices or quivers have either found or have been suggested for use in the sport of archery. Such quivers provide a means for holding a plurality of arrows within easy access of an archer in physical association with the handle riser portion of the bow.

The currently preferred form of such devices includes a vertical support member adapted in some fashion for connection to the handle or handle riser of an archery bow. In the normal orientation of the bow in use, that is, approximately vertically, the vertical support member has an upper end and a lower end. The lower end carries a fixture adapted to clamp or otherwise hold the shafts of a plurality of arrows in an approximately side-by-side, parallel, vertical arrangement. The arrows are ordinarily held with their point ends oriented upward. A tip-enclosing protector device may be carried at the upper end of the vertical support member to receive the tips of the arrows, thereby protecting the archer from possible injury by the sharp tips or broadheads of the arrows. The tip-enclosing device also functions to avoid entanglement by the arrows with obstacles such as leaves, branches, clothing, and the like.

Several problems and annoyances are associated with the quivers currently in use. The usual method for mounting quivers is to bolt them onto the handle riser of a bow, either by wood screws or by bolts turned into the accessory inserts or the sight inserts normally present on the handle risers of modern day archery equipment. This approach requires time and at least simple tools not always available in the field. Accordingly, it is often unacceptably time-consuming, awkward or otherwise inappropriate to either attach or detach a quiver in the field. For this reason, an archer may, as a practical matter, be forced to carry the quiver in association with the bow in circumstances where his preference would be to utilize the bow without the quiver in place. Alternatively, the archer may forego use of the quiver in circumstances where he would prefer to have it available.

A more significant problem to many archers is the difficulty experienced heretofore in acceptably stabilizing the quiver to avoid unwelcome vibration and noise emanating from the quiver when the bow is in use. In many hunting circumstances, silence is essential. Ready access to arrows is highly desirable under such circumstances. The use of available quivers, however, requires a balancing of such convenience against the disadvantages associated with vibration and noise imposed by the use of a quiver.

There remains a need in the archery art for a quiver arrangement which will provide for rapid selective attachment or detachment from a bow. There also remains a need for a mounting system of increased stability.

SUMMARY OF THE INVENTION

A quiver constructed in accordance with this invention includes a vertical support member with fixtures for holding a plurality of arrows approximately parallel the vertical support in generally conventional fashion. It will ordinarily also include a point guard structure (tip-enclosing device), such as a hood, as is conventional in modern quivers. In ordinary use, the quiver is held approximately vertically so that the arrows are held approximately vertically with their pointed ends up and their nock ends down. As used herein, terms such as "up," "down," "vertical," and "horizontal" assume a reference position of the quiver in an approximately vertical position mounted to a bow in firing position.

The principal feature of the quiver of this invention is the means by which it is selectively attached and detached from the handle riser of a bow. This means includes a pair of intercooperable structures, one of which is permanently or semi-permanently attached to the handle riser, and the other of which is integral with or carried in association with the vertical support member of the quiver. Each of these means may be of unitary construction or either may comprise a plurality of elements fastened to the riser and vertical support, respectively, to function as unitary structural means.

In any event, the two means intercouple with a rotational movement of the quiver with respect to the handle riser of the bow around a first attachment location proximate one end of the vertical support. A second connection is then effected between the vertical support and the handle riser at a second attachment location remote from the first attachment location. Detachment of the quiver is accomplished by disconnecting the intercoupling means at the second attachment location and rotating the vertical support to decouple the intercoupling means at the first attachment location.

The spaced attachment locations contribute to the stability of the system. The simple rotational locking system permits rapid selective attachment and detachment of the quiver to or from the bow without tools.

BRIEF DESCRIPTION OF THE DRAWINGS

In the drawings, which illustrate that which is presently regarded as the best mode for carrying out the invention.

DESCRIPTION OF THE ILLUSTRATED EMBODIMENTS

Figure 1:
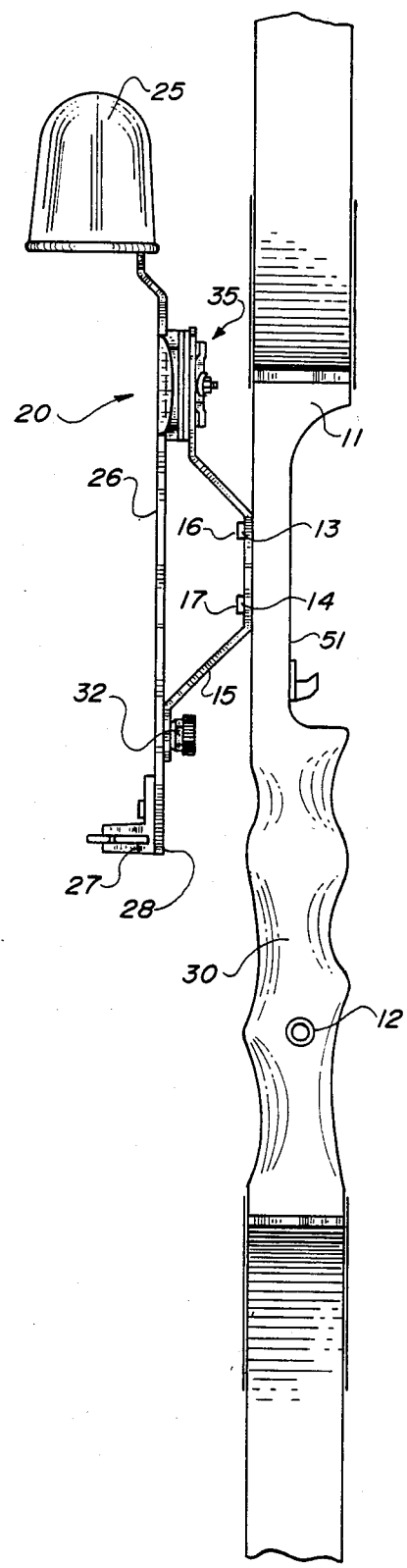
FIG. 1 is a view in elevation of one form of the invention mounted to the handle riser of a bow.
Figure 2:
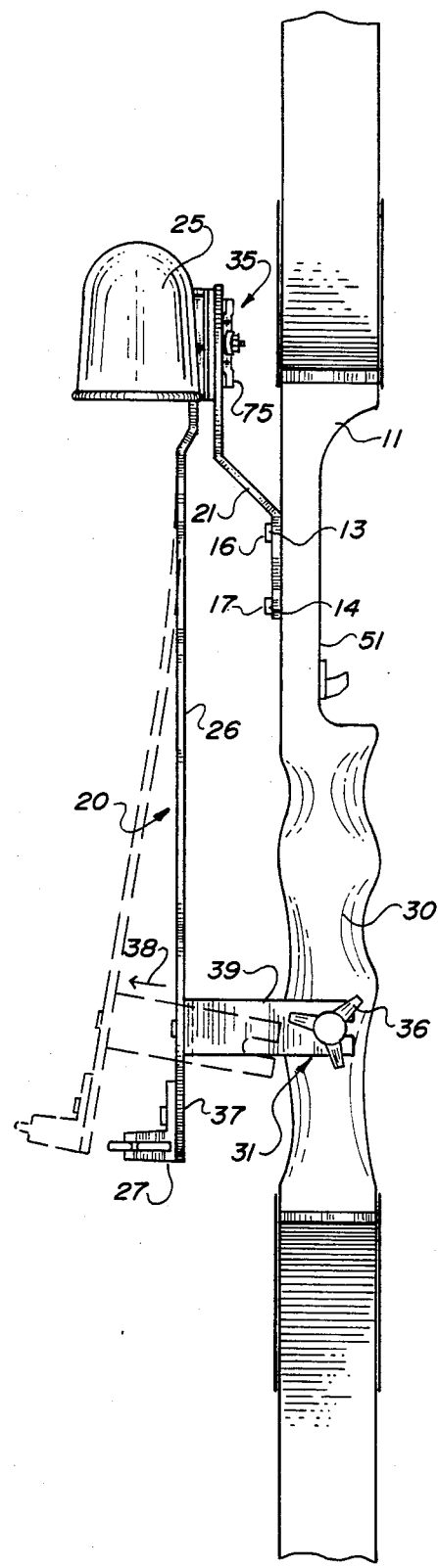
FIG. 2 is a view in elevation of an alternative embodiment of the invention with phantom lines illustrating the motion of a portion of the device.

Referring specifically to FIG. 1, the handle riser 11 of a modern archery bow includes an accessory mount insert 12 and a pair of sight mount inserts 13, 14. These inserts 12, 13, 14 occupy standardized locations, although the distance separating the accessory mount 12 from the sight mounts 13, 14 may differ within established limits. The standardized positions of the inserts 13, 14 is of significance to the present invention, because it makes feasible a similarly standardized quiver mounting system. A mounting support strap 15 is fastened by bolts 16, 17 turned into the inserts 13, 14. This strap 15 can be permanently attached to the riser 11 and left in place with the quiver 20 either connected as shown or removed. FIG. 2 shows an alternative mounting strap 21 construction similarly bolted to the riser 11 at inserts 13, 14.

FIGS. 1 and 2 each illustrate similar and conventional quivers 20 with a hood 25 carried at the upper end of a vertical support member 26. The hood functions as a point guard for arrows (not shown) with shafts clamped in an arrow shaft-retaining device 27 carried at the lower end of the support member 26. The member 26 may be of any convenient, or even variable, length. As shown in FIG. 1, its lower end 28 is suspended out from the upper portion of the handle 30 to avoid interference with an archer's hand. As shown in FIG. 2, it is parallel with and spaced from the handle 30, being anchored by separate means, designated generally 31, beneath the handle 30. A corresponding anchoring means 32 constitutes a portion of the embodiment of FIG. 1, but in that instance, the support strap 15, rather than the riser 11, is relied upon for lending rigidity to the quiver mounting system. In general, the mounting straps 15, 21, and any other attachment components, e.g. 31, should be sufficiently rigid to provide for a stable attachment with little if any vibration.

Figure 3:
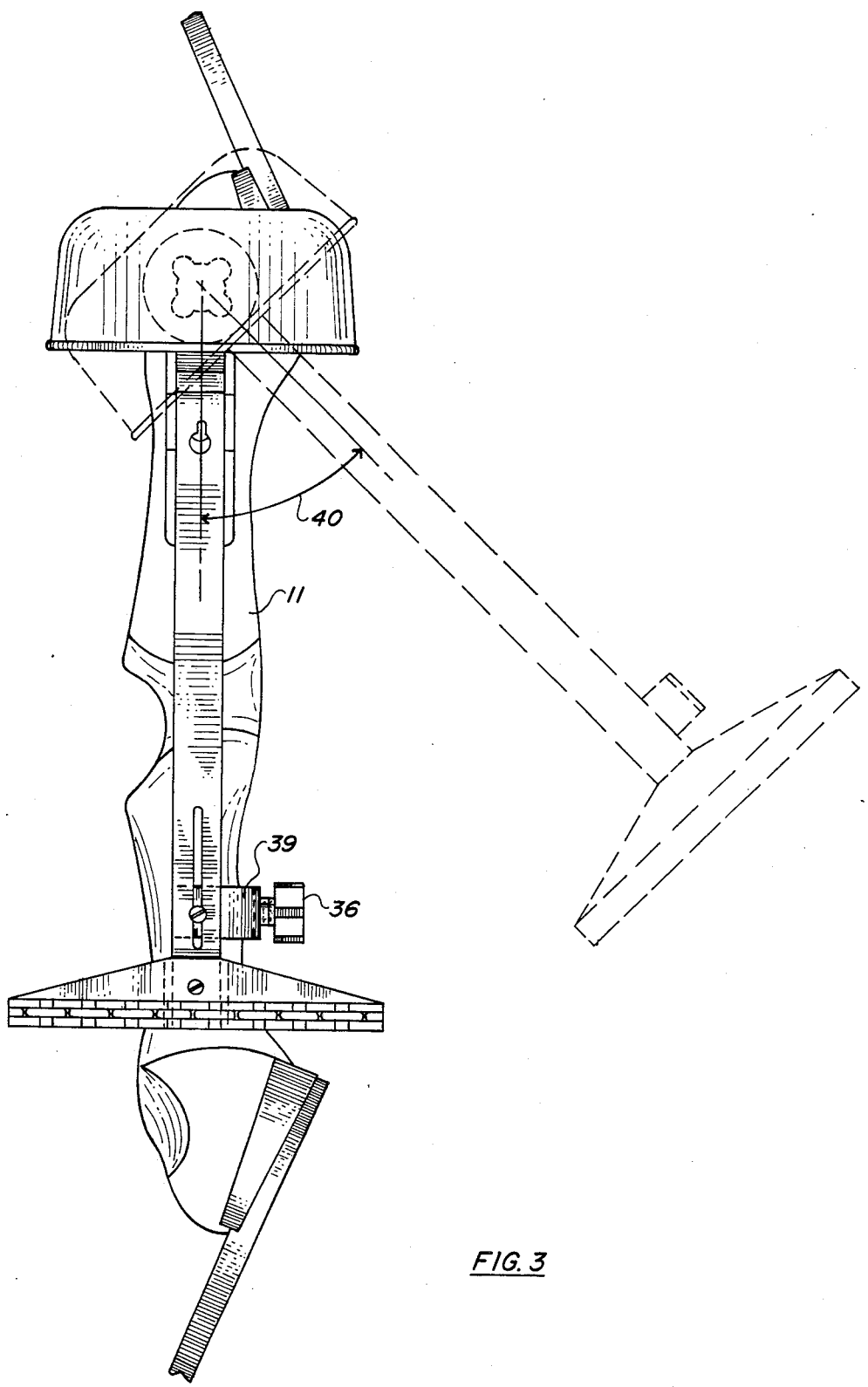
FIG. 3 is a view of the embodiment of FIG. 2 rotated 90° around a vertical axis towards the viewer with phantom lines illustrating the rotational coupling-decoupling movement of the device.
Figure 4:
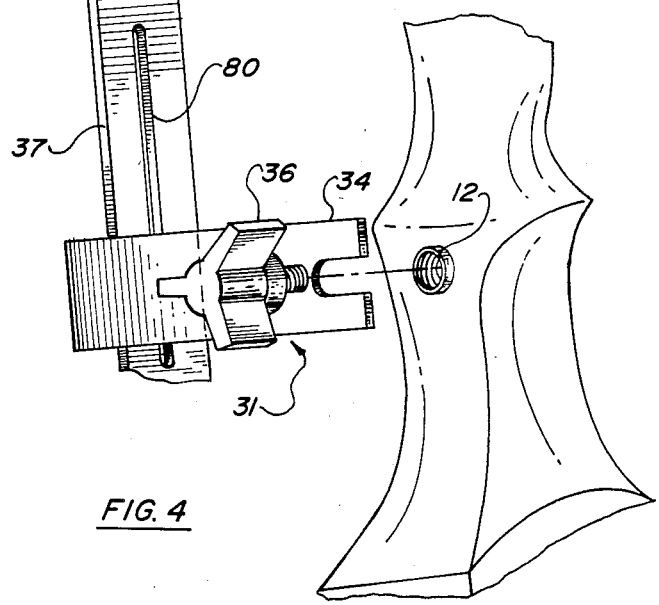
FIG. 4 is a fragmentary exploded view of the embodiment of FIGS. 2 and 3 illustrating certain component parts.

Both of the illustrated embodiments (FIGS. 1 and 2) incorporate a "twist lock" or rotational coupling mechanism, designated generally 35. The fashion in which this mechanism 35 is operated to couple or decouple the quiver 20 to or from, respectively, the riser 11 is illustrated by FIGS. 2 and 3. To decouple the quiver, for example, the handle bolt 36 (see FIG. 4) is loosened to permit movement of the lower end 37 of the vertical support 26 in the direction indicated by the arrow 38. With the vertical support biased out to the position shown in phantom lines, the slotted support member 39 is freed from attachment to the riser, thereby permitting rotation of the quiver to the right as indicated by the arrow 40 (FIG. 3) to the position shown in phantom lines. In this position, the component parts of the rotational coupling mechanism 35 are in decoupling registration, thereby permitting removal of the quiver 20 from the support strap 21. To recouple the quiver 20 to the riser 11, the decoupling procedure is reversed.

Figure 5:
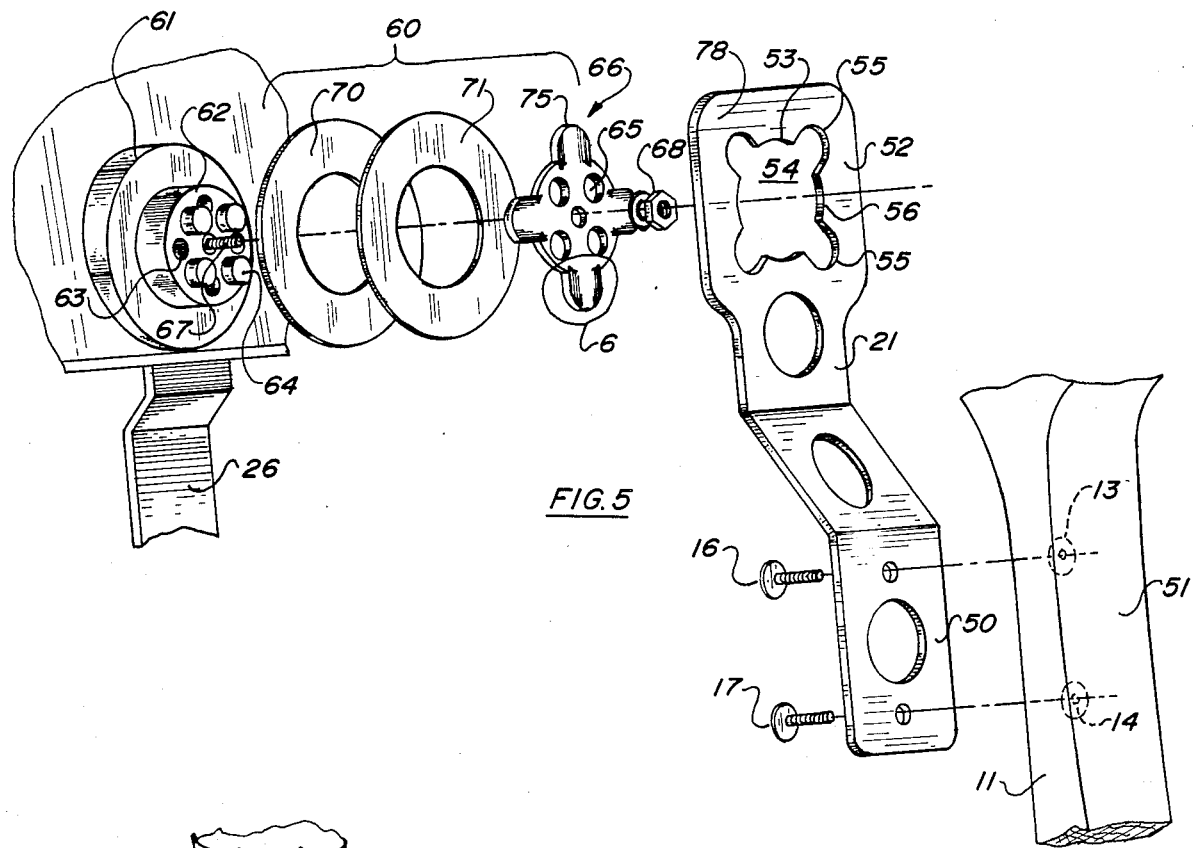
FIG. 5 is a fragmentary exploded view of the embodiment of FIGS. 2 and 3 illustrating the component parts of its rotational coupling mechanism.
Figure 6:
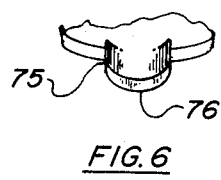
FIG. 6 is a fragmentary detailed view of the portion designated "6" in FIG. 5.

The rotational coupling mechanism 35 is illustrated in greater detail by FIG. 5. The mounting support strap 21 includes a first element 50 removably connectable against the riser 11 by means of the bolts 16, 17 as previously described. It is shown attached adjacent the sight window 51 above the handle 30 (FIGS. 1 and 2). A second element 52 extends from attachment to the first element 50 and includes a socket 53 with an entry 54 of irregular cross-section. As shown, the cross-sectional configuration of the entry 54 is basically circular with a plurality of keyways 55 projecting from its root perimeter 56. The socket 53 is held spaced from and approximately parallel the interface between the first element 50 and the riser 11.

An assembly, designated generally 60, is connected to the upper end of the vertical support member 26 and includes a base 61 with a core 62 fastened thereto, e.g. with pins 63 as shown. A plurality of stabilizing posts 64 project from the core and register with a corresponding plurality of apertures 65 in a locking lug 66. The cross-sectional shape of the lug 66 is configurated to register with the entry 54 of the socket 53 when the vertical support is rotated from its vertical position to the phantom line position shown in FIG. 3. The lug 66 is fastened, e.g. by the bolt 67 and nut 68 shown, to the distal end of the core 62, thereby loosely containing a resilient elastomeric washer 70 and a hard, abrasion-resistant washer 71 in place on the core 62 between the base 61 and the lug 66.

The lug 66 includes projecting flutes 75 with a bearing surface 76 oriented towards the washer 71 and configurated to effect a pressure application against the resilient washer 70 when the flutes 75 are inserted through the socket entry 54 (see FIG. 2) and the vertical support 26 is rotated to the vertical position shown in solid lines in FIG. 3. In this position, the surface 76 bears against the back surface 78 of the support strap 21 thereby pressing the abrasion-resistant washer 71 against the resilient washer 70. A compressive force is thus applied against the resilient washer 70. The dimensions of the core 62, washers 70, 71, flutes 75, and strap 21 are all selected to assure a snug pressure fit coupling. The abrasion-resistant washer 71 protects the resilient washer 70 from abrasion by the strap 21 as it is rotated into coupling or decoupling orientations, respectively.

Once the quiver 20 is coupled to the riser 11 as described, the lower end of the vertical support is anchored by the mechanism 31. Vertical adjustment of the slotted support element 39 is provided by the slot 80 (FIG. 4) and bolt 81 (FIG. 2). This adjustment accommodates to the various separations of the accessory insert 12 from the sight inserts 13, 14 characteristic of different bows.

The quiver construction of this invention thus provides for rapid, selective attachment or detachment of a quiver, while also providing for a stable, essentially vibration-free mounting. Various other embodiments which utilize the rotational coupling system and two-point anchoring features disclosed herein are within contemplation. Two-point anchoring is provided at a first attachment location, usually above the handle, and at a second attachment location spaced from the first attachment location. The rotational coupling mechanism, including the socket 53, is usually located at the upper attachment location. The embodiment of FIG. 2 provides a separate direct attachment to the handle riser at the second attachment location, but the embodiment of FIG. 1 incorporates the second attachment location in a rigid mounting strap 15. In both cases, however, the quiver 20 is held rigidly at two spaced apart locations, preferably near the respective ends of the vertical support 26. The vertical support 26 is thus anchored in rigid relationship with the socket 53 at a location spaced from that socket.

Reference herein to details of the illustrated embodiment is not intended to restrict the scope of the appended claims which themselves recite those features regarded as important to the invention.

I claim:

1. A system for attaching a quiver to an archery bow, said archery bow having a handle and a handle riser, said quiver including a vertical support member having an arrow shaft-retaining element at its lower end and an arrow point guard at its upper end, said system comprising: a mounting support strap having a first element removably connectable to said first element, extending upwards and spaced from but approximately parallel to said first element, said said element including a socket having an opening of irregular configuration;

a connector member fixed to said vertical support member in the vicinity of said point guard, said connector member having a configuration compatable with the configuration of said opening and being insertable into said socket through said opening when said quiver is oriented in a first position and to permit rotation of said quiver with respect to said vertical support member to a second position, said socket and said connector member being mutually adapted to couple when said quiver is moved to said second position; and means for anchoring said vertical support member in rigid relationship with respect to said socket at a location spaced from said socket.

2. A system according to claim 1 wherein said socket and connector member constitute a rotational coupling mechanism for attaching a quiver to said bow at a first attachment location near one end of vertical support member and means for attaching said quiver to said bow at a second attachment location near the opposite end of said vertical support member.

3. A system according to claim 2 wherein said mounting support strap includes said first and second attachment locations.

4. A system according to claim 2 wherein said mounting support strap is attached to said handle riser at a location above said handle.

5. A system according to claim 2 wherein said first attachment location is at one end of said mounting strap and said second attachment location is at the other end of said mounting strap and below said handle.

6. A system according to claim 2 wherein said rotational coupling mechanism includes an assembly comprising:

a base;

a core extending from said base;

resilient means carried by said core; said connector member being a locking lug attached to the distal end of said core, said locking hub being made to bear against said support strap second element when said vertical support member is in said second position, thereby to apply compressive force against said second element and in turn against said resilient means.

7. A system according to claim 6 wherein said rotational coupling mechanism is attached to said point guard at the upper end of said vertical support member.

8. A system according to claim 7 wherein said assembly is connected directly to said vertical support member opposite said arrow guard.

9. A system according to claim 8 wherein said second attachment location is below said handle.

* * * * *